(12) United States Patent
Wellner et al.

(10) Patent No.: US 6,628,767 B1
(45) Date of Patent: Sep. 30, 2003

(54) ACTIVE TALKER DISPLAY FOR WEB-BASED CONTROL OF CONFERENCE CALLS

(75) Inventors: Pierre D. Wellner, Middletown, NJ (US); Stephen T. Dacek, Rockville Centre, NY (US); Arthur A. Goikhman, Marlboro, NJ (US); Cary T. Torkelson, Allendale, NJ (US)

(73) Assignee: Spiderphone.Com, Inc., Rockville Centre, NY (US)

( * ) Notice: Subject to any disclaimer, the term of this patent is extended or adjusted under 35 U.S.C. 154(b) by 0 days.

(21) Appl. No.: 09/449,463

(22) Filed: Nov. 27, 1999

Related U.S. Application Data

(60) Provisional application No. 60/132,572, filed on May 5, 1999.

(51) Int. Cl.[7] .............................................. H04M 3/42
(52) U.S. Cl. ................... 379/202.01; 709/204
(58) Field of Search ..................... 379/202.01; 709/204, 709/205; 370/260

(56) References Cited

U.S. PATENT DOCUMENTS

| | | | | |
|---|---|---|---|---|
| 5,440,624 A | * | 8/1995 | Schoof, II | 379/202.01 |
| 5,896,461 A | * | 4/1999 | Faraci et al. | 381/386 |
| 5,916,302 A | * | 6/1999 | Dunn et al. | 365/189.01 |
| 5,995,608 A | * | 11/1999 | Detampel et al. | 370/261 |
| 6,332,153 B1 | * | 12/2001 | Cohen | 709/203 |

* cited by examiner

Primary Examiner—Ahmad F. Matar
Assistant Examiner—Quynh H. Nguyen
(74) Attorney, Agent, or Firm—Irwin Ostroff; Robert B. Ardis

(57) ABSTRACT

Participants of a conference call are permitted to see a continuously updated display on their own web browsers identifying the current speaker(s) on the conference call. In a telecommunications conferencing system which includes a conference bridge having a plurality of ports, voice connections are established between a plurality of conference participants and respective ports of the conference bridge, human readable visual labels are assigned individually to each of the participants and their respective ports, data connections are established between the conference bridge and respective video monitors for at least some of the participants, respective visual labels for the active speakers are displayed at a fixed location on each of the video monitors, the ports being used by the currently active speakers are detected, and the displayed labels are continually updated according to detected ports as the currently active speakers change. Because visual speaker labels are displayed at fixed screen locations, each participant knows where to look at all times and any need to scroll through multiple screens of data is minimized.

10 Claims, 11 Drawing Sheets

ACTIVE TALKER DISPLAY FOR WEB-BASED CONTROL OF CONFERENCE CALLS

CROSS REFERENCE TO RELATED APPLICATIONS

This application is related to and drawn from Provisional Application Serial No. 60/132,572, filed May 5, 1999, having the same title as the present application and the same inventors and assignee.

FIELD OF THE INVENTION

This invention relates generally to telecommunications conferencing and, more particularly, to telecommunications conferencing in which the identities of one or more active speakers are displayed on video monitors.

BACKGROUND OF THE INVENTION

Participants in multi-party telephone conference calls often have difficulty identifying the current speaker or speakers at any particular time. This is especially true when a conference includes large numbers of participants with similar voices and accents, and when participants do not know each other particularly well.

Some commercially available conference call bridges (see, e.g., U.S. Pat. No. 5,495,522, which issued Feb. 27, 1996, to Bruce S. Allen et al.) provide a dedicated console for use by conference call operators which can show who is talking on the conference call in real time. These consoles typically display a symbol, such as an asterisk, that flashes next to symbols for the line or lines currently talking. This is sometimes referred to as a "bouncing ball" display because the symbol appears to bounce from line to line. The conference call operator uses this display when a noisy line needs to be identified. For example, if one participant puts the conference call on hold and inadvertently plays music into the conference, that line needs to be identified and muted for the conference call to be able to proceed. A disadvantage is that, for a conference call with a large number of participants, the operator may need to scroll through at least several screens of data before identifying the most recent talker(s).

Although they make it available to the operator, most conference call systems and services do not give access to active talker information to conference participants. One that does (see, e.g., U.S. Pat. No. 5,483,588, which issued Jan. 9, 1996, to Glenn A. Eaton et al.) offers participants a touch-tone command that audibly announces the names of all connected participants and then audibly announces the name of the most recent active talker. Such an approach does not provide continuous identification of the active speaker (s), and suffers the additional drawback that a spoken recording of each participant's name must be available, requiring a registration step for all participants during which their names can be recorded.

SUMMARY OF THE INVENTION

This invention permits participants of a conference call to see a continuously updated display on their own web browsers identifying the current speaker(s) on the conference call. According to the invention, in a telecommunications conferencing system which includes a conference bridge having a plurality of ports, voice connections are established between a plurality of conference participants and respective ports of the conference bridge, human readable visual labels are assigned individually to each of the participants and their respective ports, data connections are established between the conference bridge and respective video monitors for at least some of the participants, respective visual labels for the active speakers are displayed at a fixed location on each of the video monitors, the ports being used by the currently active speakers are detected, and the displayed labels are continually updated according to detected ports as the currently active speakers change. Because visual speaker labels are displayed at fixed screen locations, each participant knows where to look at all times and any need to scroll through multiple screens of data is minimized.

From one aspect of the invention, the data connections are established over the Internet between the conference bridge and respective computers with video monitors through a web server. Because Internet connections are readily available to most users, there is usually no need for special purpose software either to be downloaded or installed on individual computers.

From another aspect of the invention, the conference bridge port being used by the loudest currently active speaker is detected, the respective label for the loudest currently active speaker is displayed, and the displayed label is continually updated as the loudest currently active speaker changes.

From yet another aspect of the invention, all of the conference bridge ports being used by currently active speakers are detected, the respective labels for all currently active speakers are displayed, and the displayed labels are continually updated as the currently active speakers change.

From another aspect of the invention, voice connections are established over the public switched telephone network and data connections are established over a packet network. The Internet is currently the most prominent example of a packet network readily accessible by a huge number of users.

From another aspect of the invention, the labels are displayed on the video monitors through broadly available web browsers, thereby eliminating any need for additional computer software to be downloaded from the web server or to be installed on any of the computers.

From another aspect of the invention, a Java programming language mini-application (applet) maintains a hypertext transfer protocol (HTTP) connection with the web server for each of the data connections, thereby allowing the web server to send current talker updates to each of the video monitors without conference participant action and without browser polling of the web server.

From still another aspect of the invention, at least some of the voice connections may be established over the packet network itself.

From yet another aspect of the invention, a personal identification number (PIN), unique within a current conference and personal to himself, is generated for at least one participant, that PIN on is displayed on that participant's video monitor, and that participant may enter the PIN over a respective voice connection to access the current conference.

From another aspect of the invention, a voice connection phone number for dialing into the conference bridge, a conference access code individual to the conference, and a PIN individual to the participant are displayed on that participant's video monitor, and that phone number and that access code are used to establish voice and data connections to the conference bridge. In addition, the PIN may be used to associate the participant's own voice connection with his own data connection.

From still another aspect of the invention, a participant may use his PIN to gain access to a current conference after a voice connection to the conference bridge has been established.

From still another aspect of the invention, a participant may use his PIN to gain access to the current conference before a voice connection to the conference bridge has been established.

From yet another aspect of the invention, summary information of talker activity during the current conference, which may include not only statistics but also charts and graphs, is collected at the conference bridge, and the collected information is displayed at the video monitors of at least some of the conference participants.

From another aspect of the invention, a Java applet is used for displaying text messages from any conference participant with a data connection to at least one of the other conference participants with a respective data connection.

From still another aspect of the invention, a Java applet is used for showing, in addition to the current talker(s), which participants have recently joined the conference.

From yet another aspect of the invention, a Java applet is used for showing, in addition to the current talker(s), which participants have recently left the conference.

From yet another aspect of the invention, at least one port is shared by multiple speakers using a directional speakerphone, the directional speakerphone transmit directional information to the conferencing system, and the directional information is combined with detected port information to update the associated currently active speaker label.

The invention may be more fully understood from the following detailed description of a specific implementation, taken in the light of the accompanying drawings and the appended claims.

DETAILED DESCRIPTION

Figure 1:
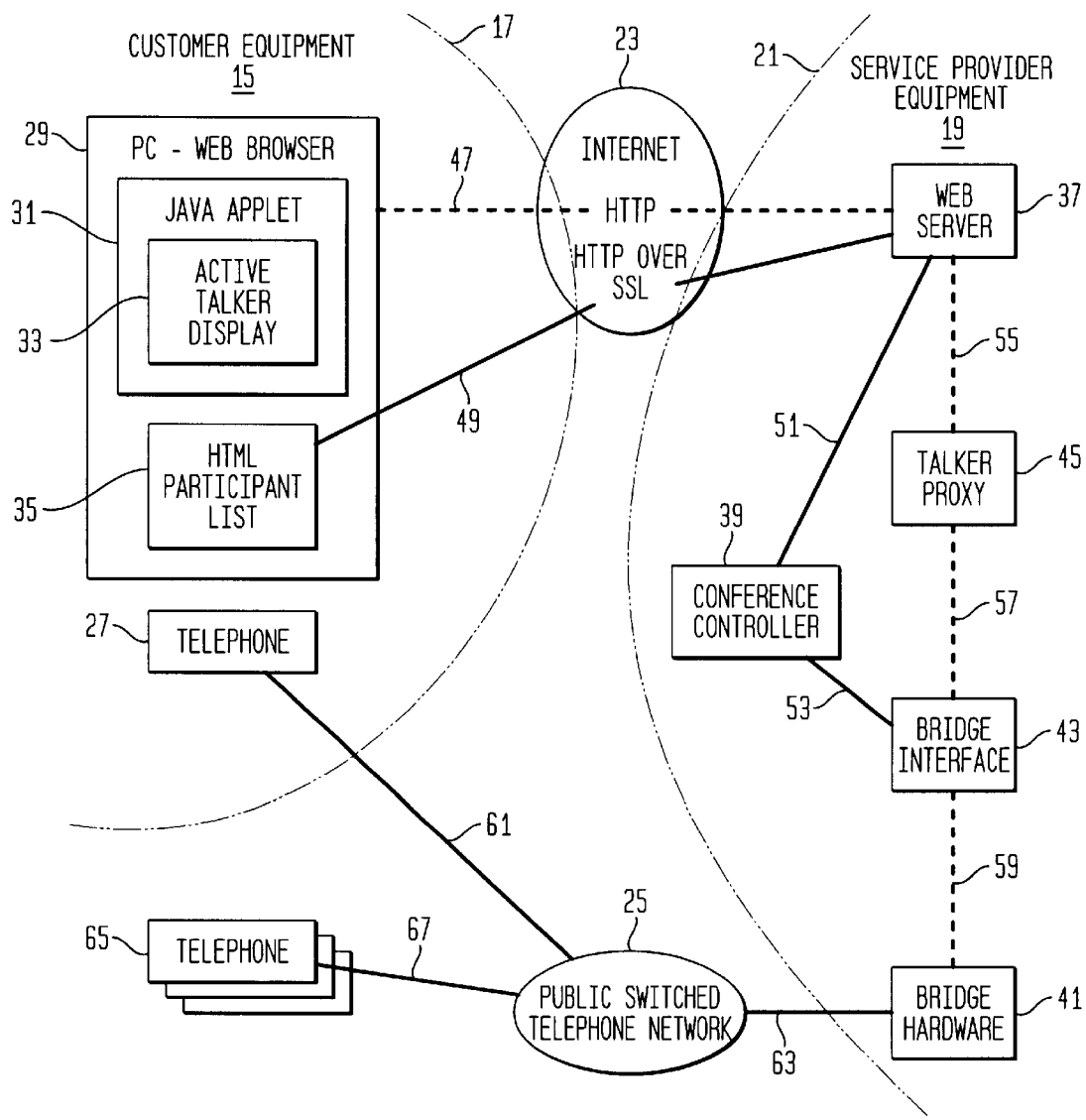
FIG. 1 is a block diagram illustrating the general architecture of the invention.

An example of the general architecture used for practicing the invention is illustrated in FIG. 1. For simplicity, only one instance of each major component is shown, but any of them may be replicated. Talker change updates are transmitted over paths represented by dotted lines. Participant name information is transmitted over paths represented by solid lines.

In FIG. 1, customer equipment 15 is shown to the left of dashed line 17, while service provider equipment 19 is shown to the right of dashed line 21. Customer equipment 15 and service provider equipment 19 are interconnected by a suitable data network 23, of which the Internet is a prime example, and by the public switched telephone network 25.

Included in customer equipment 15 is a telephone set 27 and a personal computer (PC) 29, which runs suitable web browser software. PC 29 includes a video monitor (not shown). Current examples of suitable web browsers that are widely available include Microsoft Internet Explorer, version 3.0 or later, and Netscape Navigator, version 3.0 or later. Included within the web browser is a Java applet (mini-application) 31 which provides an active talker display 33. Also included within the web browser is an HTML participant list 35.

Included within the service provider equipment 19 is a computer used as a web server 37, a console for the use of a conference controller 39, standard commercially available conference bridge hardware 41, a bridge interface 43, and a computer used as a talker proxy server 45.

As shown, a dotted line 47 represents an HTTP path from Java applet 31 in customer equipment 15 over the Internet to web server 37. A solid line 49 represents an HTTP path over SSL (secure sockets layer) path from HTML (hypertext markup language) Participant list 35 in customer equipment 15 over the Internet to web server 37. Within the service provider equipment 19, a solid line 51 represents a path connecting web server 37 with conference controller 39, and a solid line 53 represents a path connecting conference controller 39 with bridge interface 43. Also within the service provider equipment 19, a dotted line 55 represents a path interconnecting web server 37 with talker proxy server 45, a dotted line 57 represents a path interconnecting talker proxy server 45 with bridge interface 43, and a dotted line 59 represents a path interconnecting bridge interface 43 with bridge hardware 41.

Finally, in FIG. 1, a solid line 61 represents a path interconnecting telephone set 27 within customer equipment 15 to the public switched telephone network 25, and a solid line 63 represents a path interconnecting the public switched telephone network 25 with bridge hardware 41 within the service provider equipment 19. Multiple telephones 65 represent customer equipment for additional participants and a solid line 67 represents paths interconnecting them with the public switched telephone network 25. The customer equipment for each of such additional participants may include a PC, a video monitor, and software as indicated for customer equipment 15 and similar dotted and solid line Internet paths interconnecting them with web server 37 in the service provider equipment 19.

Figure 2:
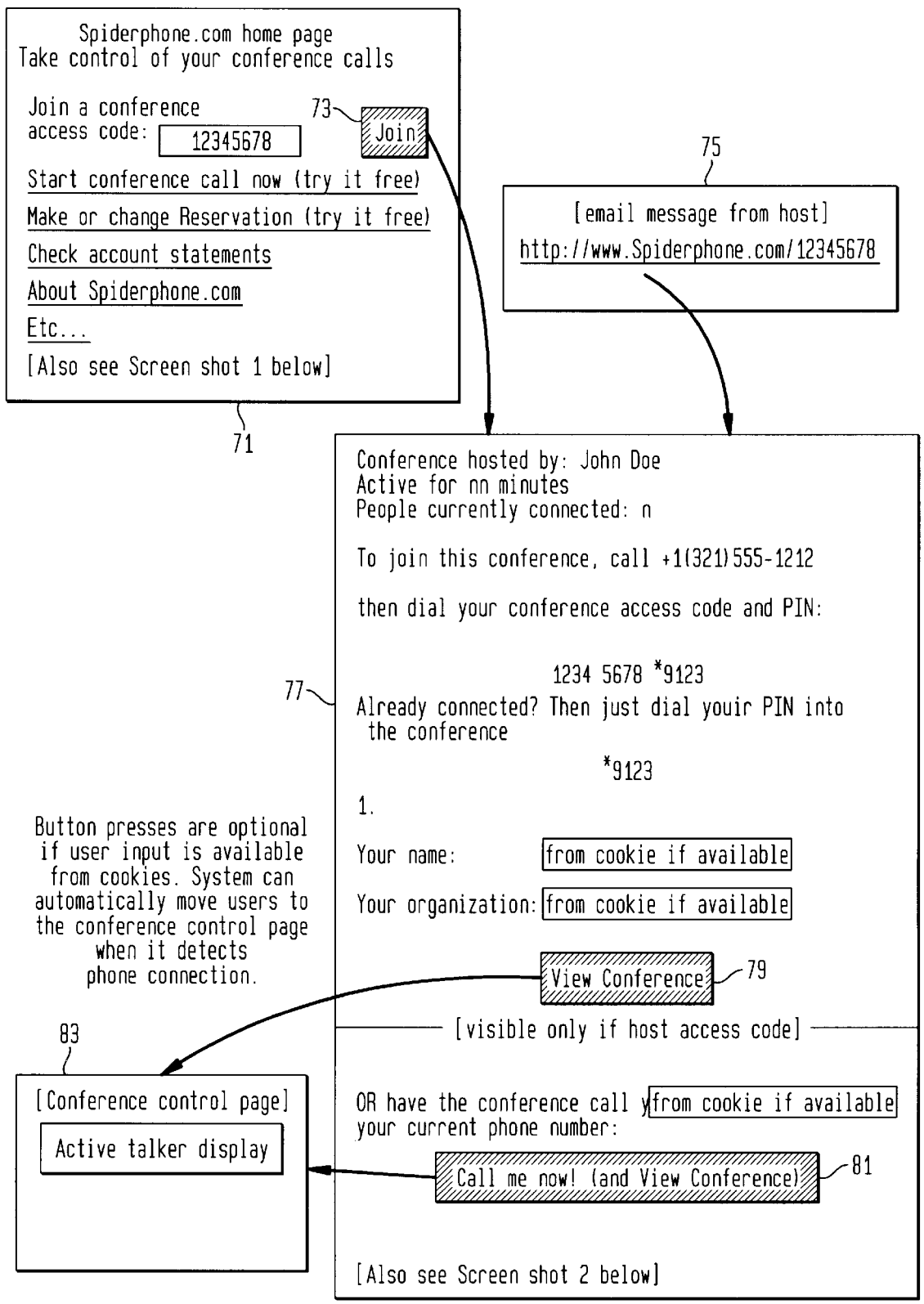
FIG. 2 is a flow chart illustrating control of a conference call through computer screens in accordance with the invention.

The flow chart in FIG. 2 illustrates a typical sequence of operations provided by the present invention. In FIG. 2, an initial screen display 71 at the web site of the service provider provides a number of options to a conference call participant. Included are such options as (1) Start conference call now, (2) Make or Change Reservation, (3) Check account statements, and (4) About the service provider (e.g., Spiderphone.com). A conference access code (12345678 in the illustrated example) is displayed along with a Join button 73. To join the conference, a user simply clicks on Join button 73.

An alternative route by which a participant may enter the conference is e-mail message 75, which provides such a user with the address of the web site controlling the conference, along with the conference identification code. In the illustrated example, this web site address is http://www.spiderphone.com and the conference access code is 12345678.

The next step in joining a conference, following either screen display 71 or receipt of e-mail message 75, takes the form of a screen display 77. Screen display 77 gives more detailed instructions for joining the conference and includes a View Conference button 79 accessible to anyone seeking to join the conference and a "Call me now/View Conference" button 81 accessible only to the conference host. Items visible to anyone seeking to join the conference are (1) identification of the conference host (e.g. John Doe), (2) the length of time the conference has already been active, (3) the number of current participants, and (4) instructions for joining the conference. Such instructions may include the telephone number to dial to join the conference, the conference access code, and a PIN (personal identification number) to be used by the new participant. The name and organization of the new participant may be displayed if a cookie (text stored in the user's PC by the Internet web site) containing that information is available. An alternative entry mode is displayed to the conference host, i.e., having a new participant call the conference host's current telephone number (displayed from an appropriate cookie if available).

Finally, after a participant has entered the conference, a conference control page 83 is displayed containing the active talker display.

By using the Internet and a web browser, the invention permits conference participants to view and control their conference calls in a convenient and inexpensive manner. A few web-based conference call control systems have either been demonstrated in the past or are available for commercial use today, but none provide a continuous display identifying the active talker(s). Such systems generally allow a conference call host or participant merely to see who is connected to the conference, and they provide some control over each conference call leg (or line) so that a web-based user can mute or hang-up a line or dial out to additional participants.

In addition to the usual web-based conference call features, the system illustrated in FIG. 1 uses a Java applet to display an identification of the current conference call speaker(s). This applet opens an HTTP connection to the conference call service provider and, as the current speaker (s) change, the HTTP server sends updates to the applet which the applet uses to display the name(s) of the current talker(s) to web-enabled participants. The invention permits display of active talker(s) identification at a fixed location and updates the talker name(s) or telephone number(s) in place, along with the organization name(s) of the talker(s). The advantage of displaying talker information at a fixed location is that users know exactly where to look to identify the active talker(s). With the prior bouncing ball approach, on the other hand, users need to scan the entire list of participants to find the active talker(s). Because a conference call can potentially include very large numbers of participants, the bouncing ball approach could require a participant to scroll through multiple pages on the screen of his computer monitor.

Standard web browsers and servers today are generally used for client-initiated updates, where web-browsers update their displays in response to user actions rather than in response to server actions. Applications that are updated by servers (including so-called "push" applications) are usually considered to be separate from the browser and usually require a separate software download. The present invention provides a technique for updating the active speaker display in a web page. This technique may be useful in other applications as well besides conference call displays because it has the following characteristics:

1) It works with standard web browsers available from Microsoft and Netscape since versions 3.0.
2) It does not require download or installation of any browser plug-in or additional software.
3) Updates to the display are initiated asynchronously by the HTTP server without user interaction.
4) Browsers do not have to poll the server.
5) Private data is transmitted only over encrypted communication links.
6) Communication will work through standard firewalls and proxy servers.

To keep user data secure, the Java applet does not transmit or receive private data (such as names, phone numbers, or conference access codes) in the clear. Instead, it receives all private data through Java parameters and function calls that are passed to it from one or more HTML frames. All the data on these HTML frames are transmitted on an encrypted connection over SSL using HTTPs, URLs (uniform resource locators—the addresses of resources accessible on the Internet), and the encryption facilities built into standard web browsers and web servers.

The Java applet maintains a table of names indexed by unique integer leg handles. The Java applet also keeps an open HTTP connection to the server, which the server uses to notify the applet of talker changes by transmitting leg handles of the current talker. As the applet receives these leg handle updates, it uses them to look up and display the name of the current talker. A side effect of maintaining this open HTTP connection while the applet is running is that the server can keep track of which participants are currently web-enabled and display this information to all participants. This information is useful to participants using the "whisper chat" feature described below.

As an alternative to this hybrid HTML/Java implementation, the entire conference control user interface (including the active talker display) may be implemented by the Java applet without need for an HTML page. The conference control user interface may also be implemented in HTML without the need for Java if the browser supports features that allow the web server to asynchronously update the browsers. Such features may include Netscape's server push, Microsoft's ActiveX, a browser plug-in, or Microsoft's selective caching directives.

As new participants join the conference call and other participants hang up, the table of names maintained by the talker applet is updated. In order to receive the updated name list, a new, encrypted HTML page is loaded. To accomplish this, the applet requests the browser to reload an HTML page. If the applet were to be reloaded this would cause a significant delay, so only the HTML is reloaded in a separate frame so that the applet may continue to run undisturbed. When the new page has been loaded in the browser, it uses JavaScript to call Java methods and pass the updated names to the applet. Using this technique, new names can be added to the table without transmitting them in the clear and without reloading the applet.

An additional feature of this applet is that it also displays the names of participants who have recently joined and/or recently dropped.

The names and organizations shown on the active talker display may come from a number of different sources:

1) Participants who join the conference with their web browser are prompted for their name and organization before they are allowed to see the conference call display page. A leg PIN, unique within that particular conference, is dynamically assigned to each web-based participant, and that PIN must be entered over the telephone in order to associate the correct phone leg to each web-enabled participant 2) Participants with host privileges can assign a name and organization to any leg of the conference call using their web browsers.

3) For dial-out legs, the person initiating the dial-out command supplies name and organization data along with the telephone number.

4) Legs that do not have manually assigned names are automatically labeled with their caller-id phone number if available on dialed-in legs, or the number actually dialed in the case of dial-out legs.

5) If no name or telephone number is available, then a unique name such as "Unknown #1" is generated by the system.

6) If a telephone number is available but no name has been set manually, then a reverse telephone number lookup can be used to assign a name automatically. If no name is found, the area code can be used to assign a city and state. Databases for doing this are commercially available on disk and also on the Internet. In some cases the reverse telephone number lookup can be performed by the telephone carrier and transmitted to the bridge along with the caller id.

In order to distribute the burden of associating each conference port with a name, a mechanism is provided for letting each web-enabled participant enter his or her own name and associate it with a telephone connection. This association is also required to give web-enabled participants individual control over their own telephone connections without necessarily giving them control over other participant connections. For example, a participant without a host access code can set the name, mute, or hang up his own line, but cannot do these things to any other lines.

Existing systems (e.g. Latitude) solve the association problem by pre-registering each participant with a unique ID (identification). When participants dial in to the bridge they must not only enter their conference code, but they must also enter their unique personal ID and they use the same personal ID when connecting to the system from a computer over the data network. Unregistered participants cannot be identified. The drawback to this approach is that participants must be pre-registered to enjoy the full benefits of the user interface, and they must remember their personal identification number. The system described herein dynamically assigns personal identification numbers to each web participant at the time when they first enter their conference code on the web. The method described below offers the following advantages over the prior art:

1) It allows the conference host to broadcast e-mail with the same conference code to all participants. It is not necessary to send individual e-mail to each participant with a unique access code.

2) Participants do not have to pre-register with the system in order to enjoy its full capabilities.

3) Participants do not have to remember a personal identification number from one conference to the next.

The web connection and telephone connection may be linked together in slightly different ways depending on whether a call is established by dialing into the bridge or by dialing out of the bridge, and whether the user goes to the web site before or after connecting by telephone. There are four possible scenarios (see FIG. 2 for illustration of web page content):

1) Web, then dial-in.

Participants go to the web site and enter a conference access code, or they click on a hyperlink that already includes a conference access code. If this access code is valid the system generates a PIN unique within this conference and displays it on the participant's web page, along with instructions on what phone number to dial and how to enter the access code and PIN. After the user has dialed in and entered this access code and PIN the participant's browser loads the conference control page along with the active talker display. This may be done in response to a user mouse click, or this may be done automatically by the system in response to dialing in by telephone so long as the participant's name is available in a cookie from a previous session.

2) Dial-in, then web:

After dialing into the bridge, participants are prompted for their access codes. If a code does not include a PIN, no web-port association is made at this time, but the participant is told that he or she can see who is talking on this call by going to the web site. If they go to the web site and enter a valid access code they see the same instructions as above, but the instructions say that if they are already connected, they only need to enter the PIN on their telephone keypad. After entering the PIN on the telephone, the system allows the participant to see the conference control page and active talker display, as above.

3) Dial-out, then web:

On a dial-out leg, the participant receives a phone call that was initiated by a conference host. If the call is placed live from within the conference then this participant may never find out about the web interface unless another participant tells him about it, or if he presses the * key on his phone. If the participant learns the-URL and conference access code, however, then he may view the conference and active talker display using the same process as above. In a blast-dial scenario, the user receives a phone call from the conference with a recorded message that prompts him to press a tone to enter the conference. At the same time, this recorded message can also inform the user of the web site and access code.

4) Web, then dial-out:

Another alternative is for a participant to initiate the dial-out to himself from his own web browser. In this scenario, a participant goes to the web site and enters the access code, or goes directly to a URL that already includes the access code. As before, a PIN is automatically generated, but as an alternative to dialing in, the participant has the option of entering his phone number for the bridge to dial. After the call is completed the participant can view the conference and active talker display.

The active talker Java applet can also display text messages sent from any web-enabled participant to all other web-enabled participants, a subset of this group, or just to a single other participant. This capability is similar to well-known text chat applications such as IRC (Internet relay chat), MUD (multi-user dimension), Instant messages, and ICQ (I seek you). The difference in this case is that this chat client is tightly integrated with the telephone conference call application, so it does not require a separate registration, login, communications channel, or window. Participants are "logged in" to the running chat client automatically as a side effect of viewing the conference call, and they do not have to do anything more to receive chat messages. The conference call control page has an icon that indicates which of the other participants are web-enabled. Chat message senders can therefore see who is available on the call to receive text messages. Participants do not need to pre-arrange a means to communicate with each other off-line during the conference, and they do not need to say anything to each other about their off-line communication during the conference call. This feature makes it easy for two participants to communicate with each other off-line in secrecy while they are talking to a group.

Detecting the active talker is done on the conference bridge DSP (digital signal processor) based hardware. Most conference bridges must track the relative gain of each port as part of the algorithm they use to determine how to mix the signal from ports in each conference, so many conference bridges make the currently active talker information available to the programmer. The conference service application must map the relative port amplitudes to conference leg handles and then to conference participant names. In some instances, the conference service itself may play a voice prompt or sound effect into the conference, and this system voice may be the loudest talker at that moment. In this instance, three different things may happen, depending on the particular situation:

1) The active talker display shows that the "system" is talking.
2) No change in talker is reported as though the system prompt was never played.
3) The next loudest talker (after the system) is displayed as the active talker.

While a particular talker is muted, no one else on the conference call can hear his or her assigned bridge port, but the conference bridge hardware may still be listening to it and may report it as the loudest talker. In this instance, the system does not report the muted port as the loudest talker but reports the next loudest port instead.

Displaying a single loudest talker is normally sufficient. If more than one person on a conference call starts to speak at the same time, this situation is usually resolved very quickly so that only one person ends up talking. If desired, however, more than one talker can be displayed simultaneously, at the expense of using up more screen space.

Talker change events originate from a single point (the bridge hardware and bridge interface), but they must be transmitted to multiple web-enabled participants. One available technique for reducing the load on the bridge interface is to make use of talker proxy server 45 (proxy servers are well known in distributed programming) as shown in FIG. 1. The bridge interface sends talker update events only to the talker proxy server (or servers) 45 in FIG. 1 which may be on a different machine, closer to the web-based end users. The talker proxy is then responsible for sending out the multiple updates to each of the web-based participants. As described above, this information is then transmitted over HTTP to a Java applet running on the web-based participant's browser to show the name of the current talker.

While collecting and transmitting talker change events, the bridge interface or talker proxy can keep a record of talker activity during the conference. It can store detailed records of when each person is active, or it can simply store aggregate statistics. At any time during the conference, it may then be possible for web-based participants to view these statistics as a pie chart, for example, to see who has been talking most and least.

FIG. 1 shows how the different components of the system are connected to implement an active talker display. For simplicity of presentation, only one instance of each component is shown, but any of them may be replicated. Talker change updates are transmitted over the paths represented by dotted lines. Participant name information is transmitted over the paths represented by solid lines.

The remaining figures are all screen shots showing the appearance of a participant's PC monitor at various stages of a conference call.

Figure 3:
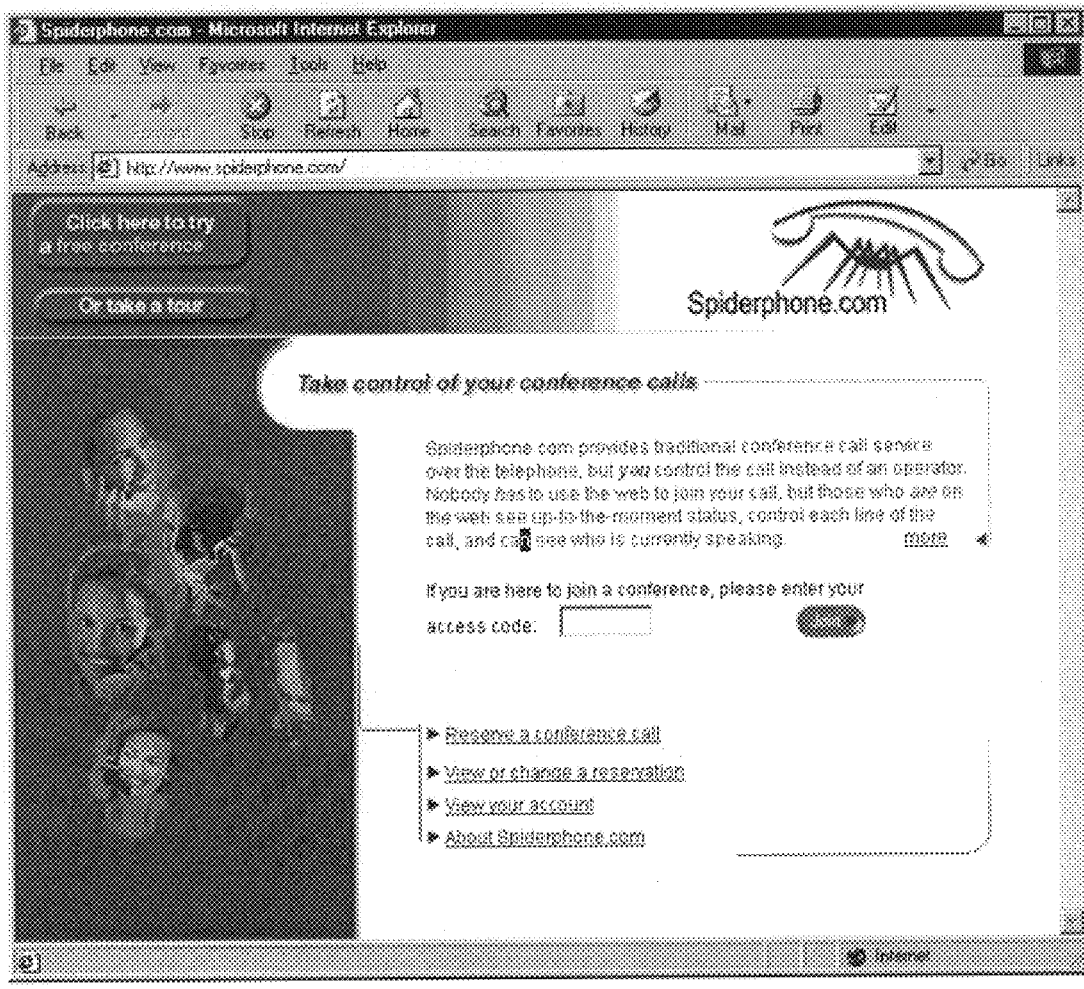
FIG. 3 is a video monitor display screen shot of a service provider home web page, in accordance with the invention, with provision for entering an access code.

FIG. 3 is a screen shot of the service provider's home page on the Internet, including means for entering an access code and joining a conference.

Figure 4:
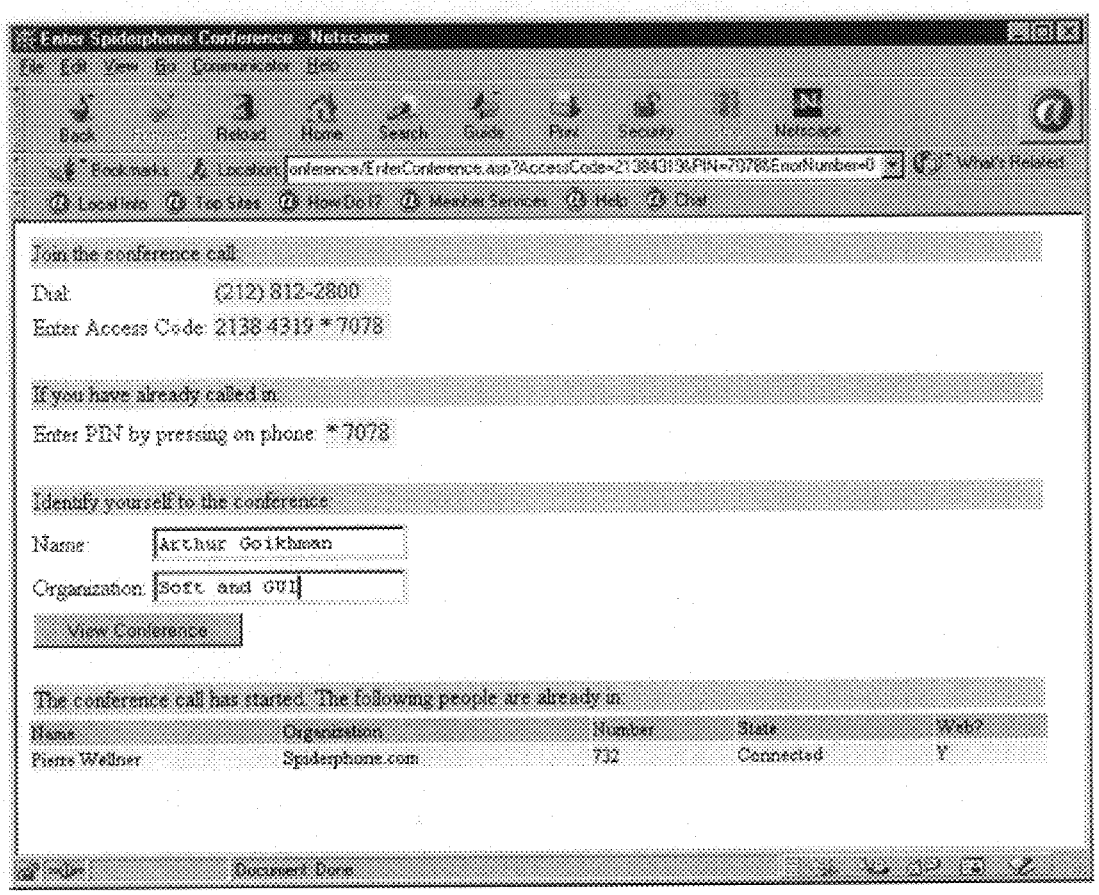
FIG. 4 is a video monitor display screen shot showing what a participant in a conference call, in accordance with the invention, sees after entering a conference.

FIG. 4 is a screen shot of a participant's PC monitor, showing what happens after the access code has been entered in FIG. 3 and the participant has clicked on "Join". Alternatively, this is what happens after the participant has clicked on the URL http://www.spiderphone.com/21384319. This screen gives instructions on what number to call, and the access code and PIN to enter. If the conference call has already begun, this screen also shows who is already connected. There is a space for the user to enter a name and organization. If the user has already entered this information during a previous session, then these fields may be pre-populated with the previously entered values. If the user presses the "View Conference" button before dialing in with the access code and PIN, the same page is displayed again with a message that says "You must dial in and use your PIN before viewing the conference. If you are already in on the conference call, press *6761 on your phone and try again."

Figure 5:
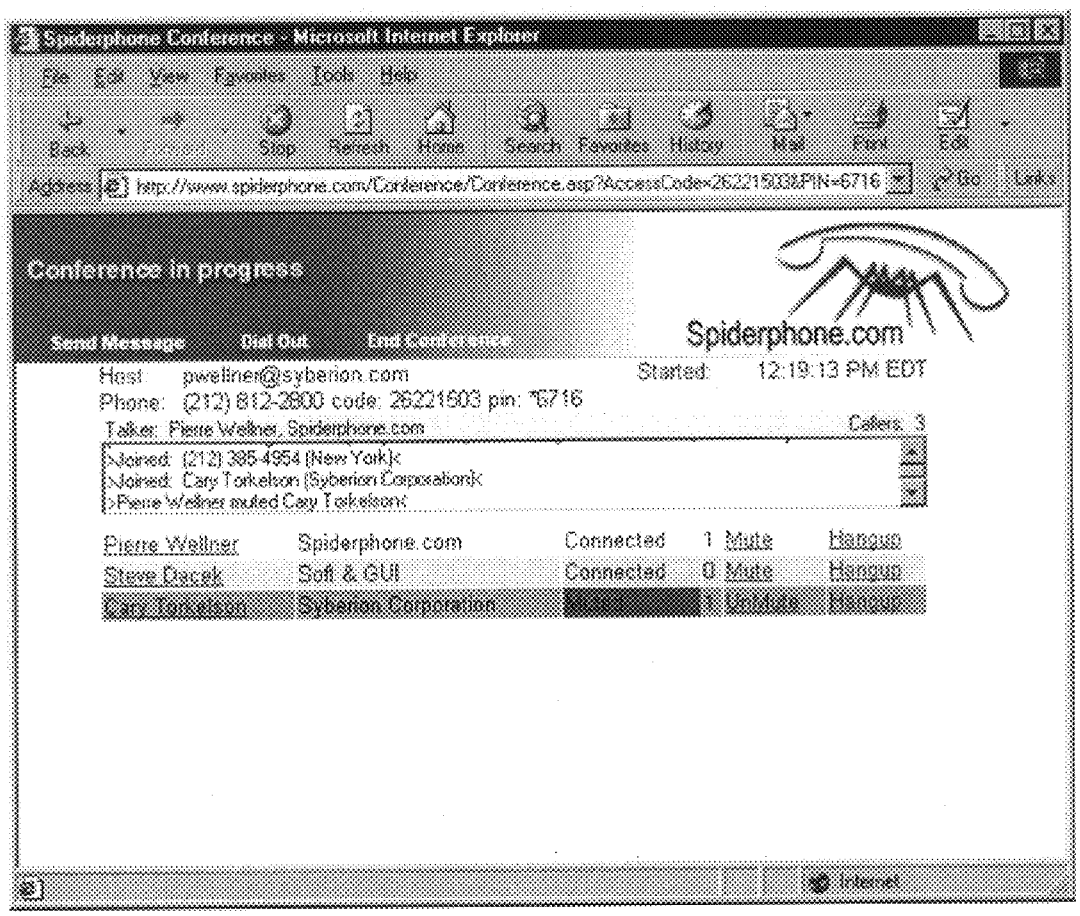
FIG. 5 is a video monitor display screen shot showing what a participant sees after pressing the "View Conference" button in FIG. 4.

FIG. 5 is a screen shot illustrating a user's PC monitor after the user has dialed into the conference with access code and PIN and pressed the "View Conference" button. This example shows a conference with three participants. Pierre Wellner is the user who is displaying this web page, Steve Dacek has dialed in and is not using the web (represented here by the number 0 to the right of the word "connected"), and Cary Torkelson has also dialed in and is using the web. The current talker is displayed as "Pierre Wellner, Spiderphone.com". The scrollable text area just below the current talker shows other recent system events. Cary Torkelson recently joined the conference. When he first joined by phone his name and organization were unknown, so the system used, as a default label, his phone number obtained by caller-id and the location derived from his phone number. After joined by web, the system updated his name and organization is the labels he provided with his browser. Pierre Wellner muted Cary Torkelson's line by pressing the "Mute" link on this page. The action is displayed in the scrollable text area, and the line state is shown as "Muted" instead of "Connected."

Figure 6:
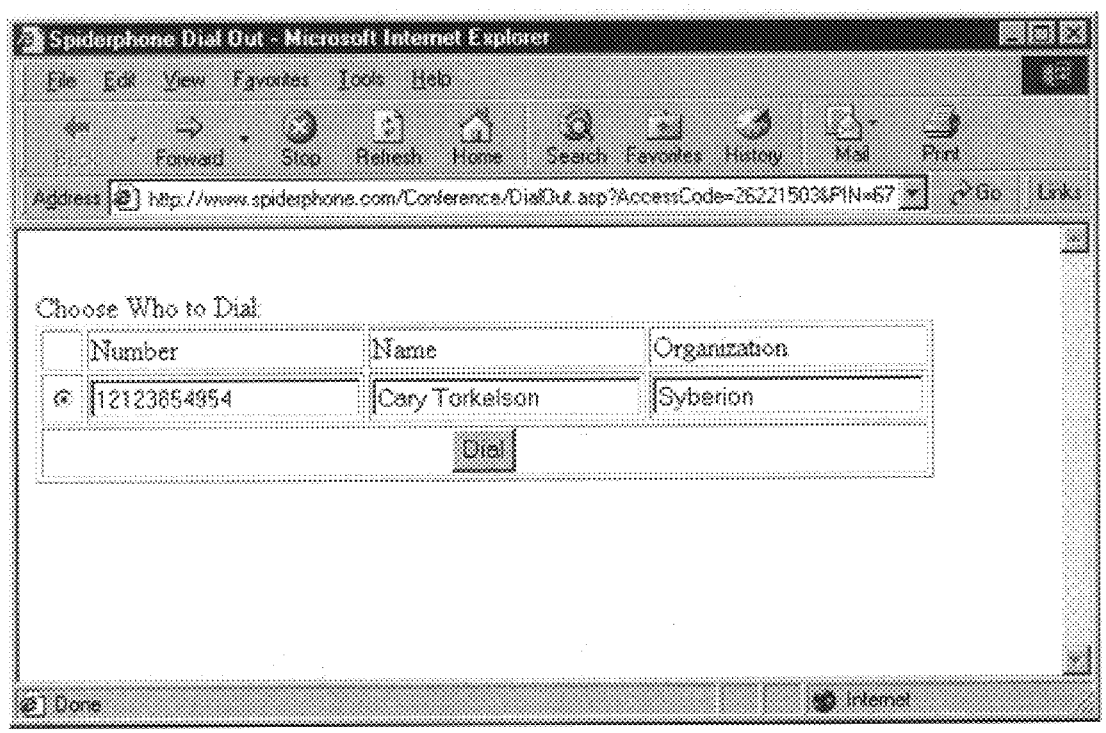
FIG. 6 is a video monitor display screen shot showing how a conference host is permitted to dial out to additional participants.

FIG. 6 is a screen shot illustrating what happens after the "Dial Out" button in FIG. 5 has been pressed. FIG. 6 permits a conference host to dial out to add additional participants.

Figure 7:
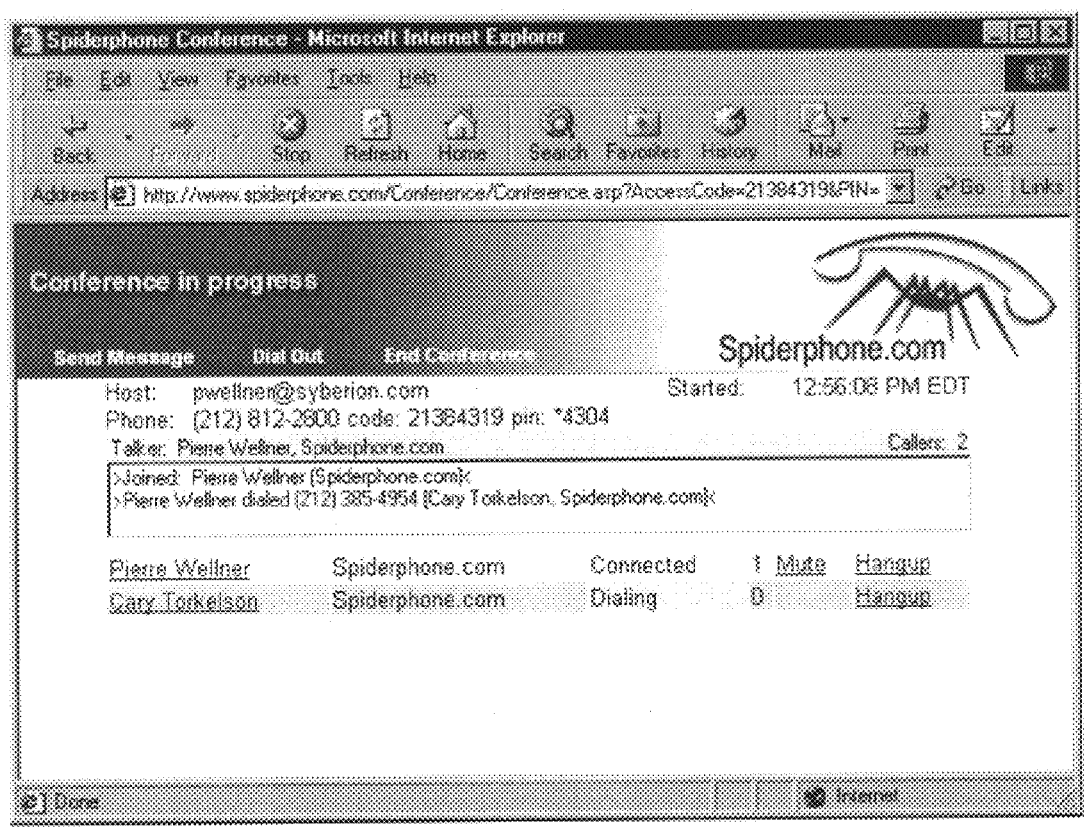
FIG. 7 is a video monitor display screen shot showing what a participant sees while being dialed from within a conference.

FIG. 7 is a screen shot illustrating what happens while a participant is dialed from within the conference. Here, the line state shows "Dialing" and the scrollable text area show who initiated the dial out.

Figure 8:
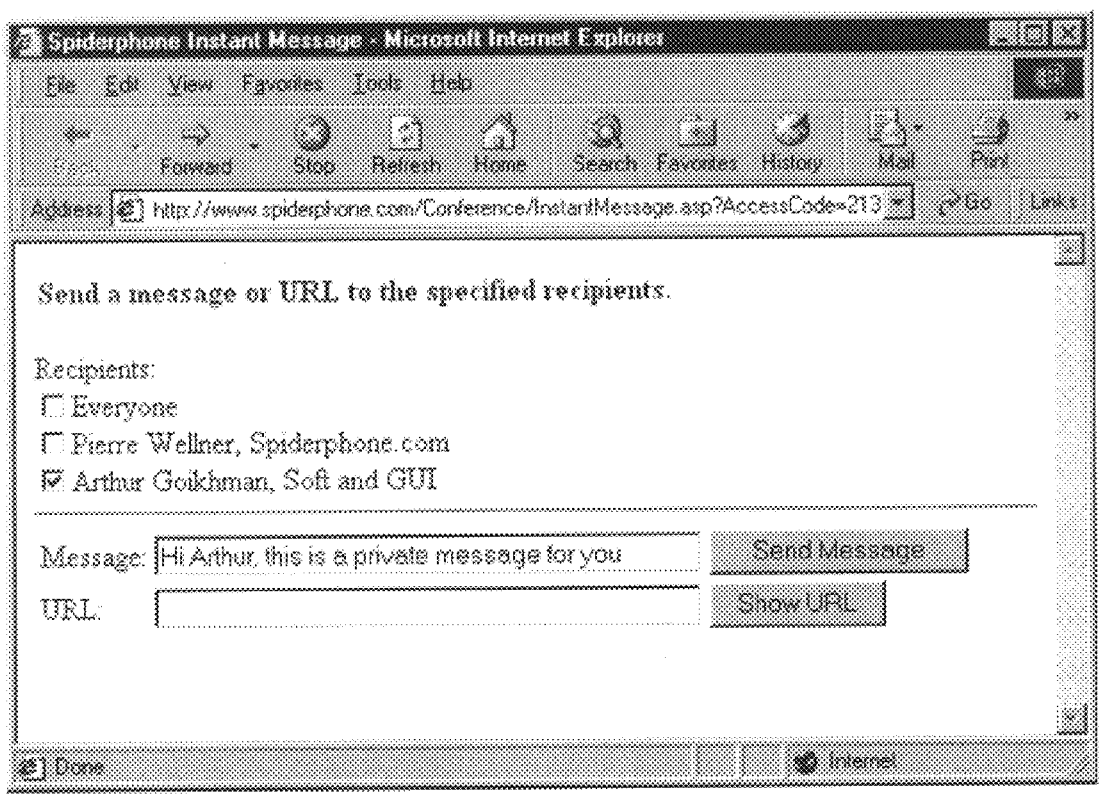
FIG. 8 is a video monitor display screen shot showing how one conference participant initiates sending a private text message to another participant.

FIG. 8 is a screen shot showing what happens after Pierre Wellner presses the "Send Message" button. This page pops up in a new window, allowing him to type a private text chat message for Arthur Goikhman.

Figure 9:
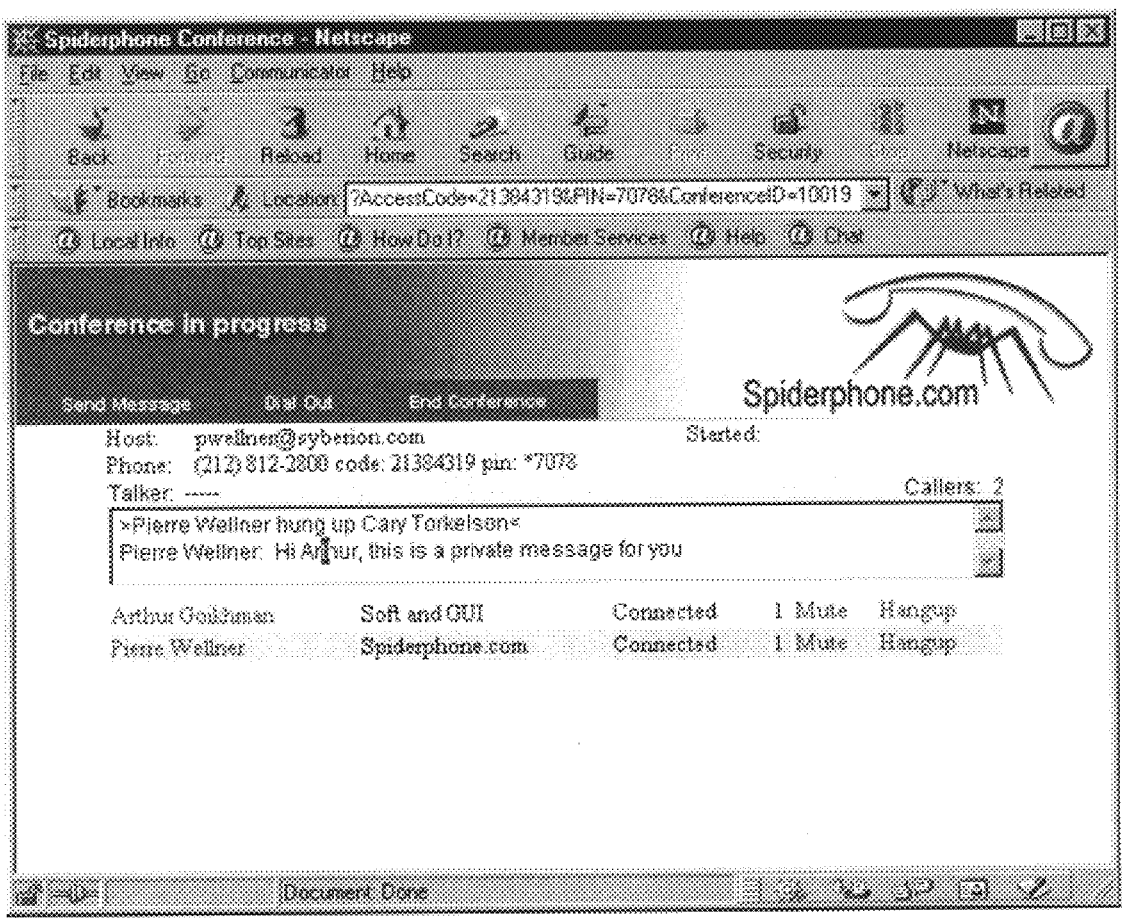
FIG. 9 is a video monitor display screen shot showing the view of the conference by another participant.

FIG. 9 is a screen shot showing Arthur Goikhman's view of the conference. He appears first on the list of participants, he is using Netscape, and he has just received a private text message from Pierre Wellner in the scrollable text area. At this particular moment, no one is actively talking on the call.

Figure 10:
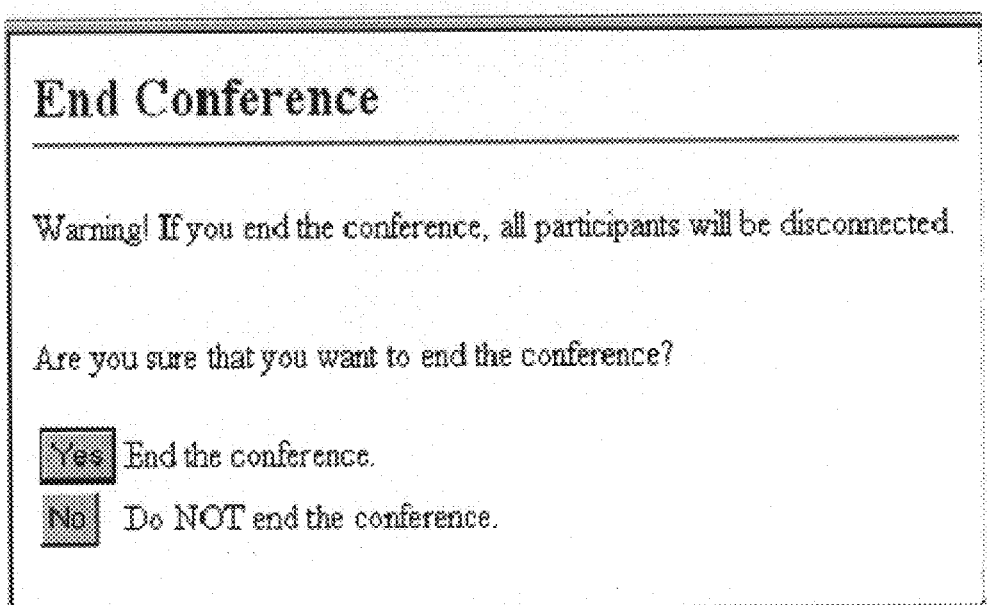
FIG. 10 illustrates a video monitor display pop-up confirmation screen which appears when the host prepares to end the conference.

FIG. 10 is a screen shot what happens after Pierre Wellner hits the "End Conference" button. A pop-up confirmation screen appears. If he presses "Yes", then everyone gets the "Conference has Ended" page showing summary information.

Figure 11:
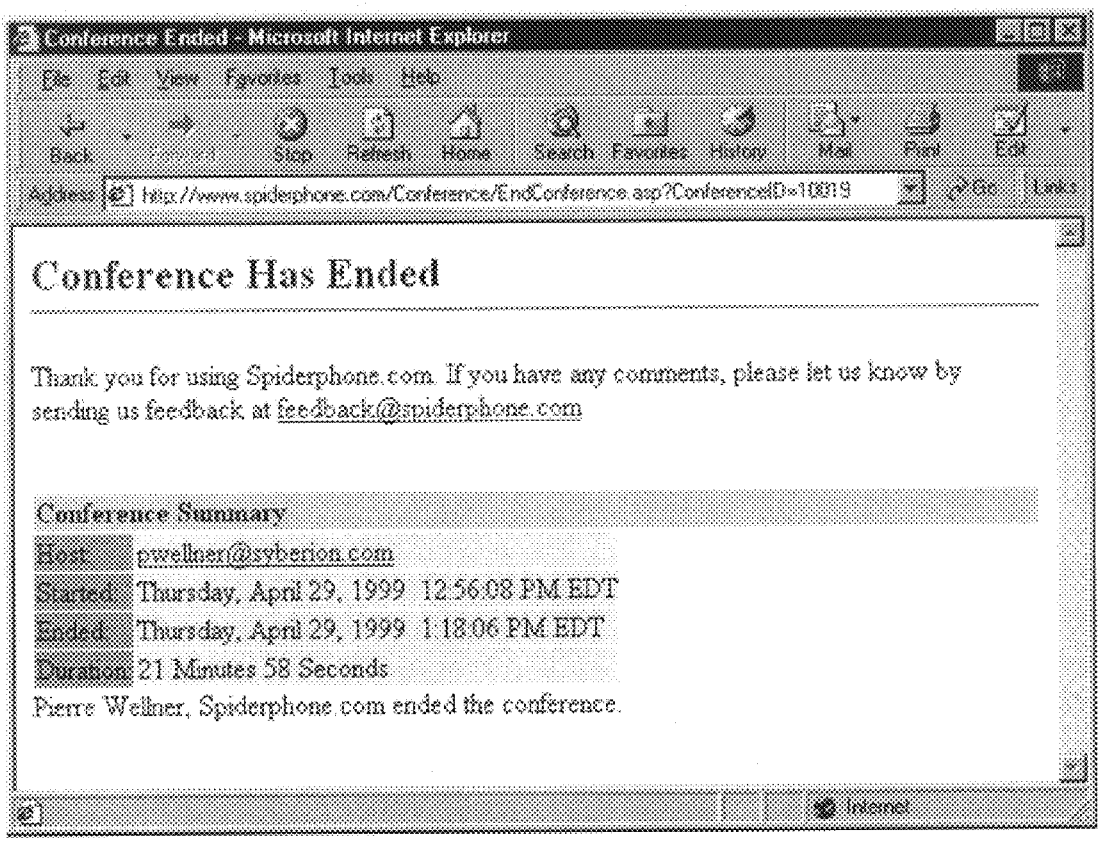
FIG. 11 illustrates a final "Conference has Ended" video monitor display screen showing conference summary information.

FIG. 11 is a screen shot of the "Conference has Ended" page, showing appropriate summary information.

Sometimes multiple people at a single location all share a single speakerphone while participating in a conference call. In this instance, multiple people share a single telephone line (e.g., line 61 in FIG. 1), and the conference call system of the present invention is not able to use relative line levels to distinguish between different people who share the same line. Users would normally deal with this situation by assigning the line a label that includes all participants on that line, e.g. "Bob, Joe and Mary", or "Washington." Other participants would see this label appear when any one of the participants on that line spoke, but could not distinguish between them.

Some speakerphones are able to detect the direction from which sound is coming using technology such as phased array microphones or other directional microphones. One example of such a speakerphone currently on the market is the ClearOne Intelligent Speakerphone manufactured by ClearOne, Inc. of Woburn, Mass. (web site: http://www.clearone.com). ClearOne's "Voice Tracking Microphone" automatically detects the location of the current speaker and lights up one of six LEDs (Light Emitting Diodes) on the device showing the direction of the current talker.

Combining such directional telephone technology with the active talker display of the present invention (e.g., as telephone set 29 in FIG. 1) can overcome the limitation of a single speakerphone in a room. If the directional telephone is configured to communicate with the conference call system, then an association can be made between the direction of the talker and the name of the talker. As the directional telephone transmits current speaker direction data to the conference call system, the conference call system can display the associated name on the active talker displays.

Communication of data between the directional telephone and the conference call system may be established in several different ways. If the telephone transmits voice over data (e.g. an IP or Internet Protocol telephone), then transmitting talker direction data information is straightforward. If the telephone is only connected to the public switched telephone network (PSTN) by an analog line, then the data is transmitted over the same channel as the voice (e.g., by using DTMF or Dual Tone Multi Frequency signaling), but this may be difficult to do without interfering with the quality of the voice signal. If the telephone and conference call system both use ISDN (Integrated Services Digital Network) then information can be transmitted over the D-channel (which carries control and signaling information) in parallel without interfering with the voice on the B-channel (which carries data, voice, and other services).

It is to be understood that the embodiment of the invention which has been described is illustrative. Numerous other arrangements and modifications may be readily devised by those skilled in the art without departing from the spirit and scope of the invention.

What is claimed is:

1. A method of operating a telecommunications conferencing system which includes a conference bridge having a plurality of ports, said method of operation comprising the steps of:
    establishing voice connections between a plurality of conference participants and respective ports of said conference bridge;
    assigning human readable labels individual to each of said participants and their respective ports;
    establishing data connections between said conference bridge and respective video monitors for at least some of said participants;
    displaying respective ones of said labels for the active speakers at a fixed location relative to the location of labels from other participants on each of said video monitors;
    detecting which of said ports are being used by the currently active speakers; and
    continually updating said displayed labels according to detected ports by changing the labels at said fixed location as the currently active speakers change.

2. The method of claim 1 in which the one of said ports being used by the loudest currently active speaker is detected, the respective one of said labels for the loudest currently active speaker is displayed, and the displayed label is continually updated as the loudest currently active speaker changes.

3. The method of claim 1 in which:
    said data connections are established between said conference bridge and respective computers with video monitors through a web server;
    said labels are displayed on said video monitors through web browsers, thereby eliminating any need for additional computer software to be downloaded from said web server or to be installed on any of said computers; and
    a Java programming language mini-application (applet) maintains a hypertext transfer protocol (HTTP) connection with said web server for each of said data connections, thereby allowing said web server to send current talker updates to each of said video monitors without conference participant action and without browser polling of said web server.

4. The method of claim 1 further including the steps of:
    generating a personal identification number (PIN), unique within the current conference and personal to himself, for a participant;
    displaying said PIN on said participant's video monitor; and
    entering said PIN by said participant over a respective one of said voice connections to access said current conference.

5. The method of claim 4 in which:
    a voice connection phone number for dialing into said conference bridge, a conference access code individual to the conference, and a PIN individual to said participant are displayed on said participant's video monitor; and
    said phone number and said access code are used to establish voice and data connections to said conference bridge and said PIN is used to associate said participant's own voice connection with his own data connection.

6. The method of claim 4 in which:

said participant uses said PIN to gain access to the current conference after a voice connection to said conference bridge has been established.

7. The method of claim 4 in which:

said participant uses said PIN to gain access to the current conference before a voice connection to said conference bridge has been established.

8. The method of claim 3 in which said Java programming language mini-application (applet) is used for displaying text messages from any conference participant with a data connection to at least one of the other conference participants with respective data connections.

9. The method of claim 1 in which at least one of said ports is shared by multiple speakers using a directional speakerphone, said directional speakerphone transmits directional information to said conferencing system, and said directional information is combined with detected port information to update the associated currently active speaker label.

10. A telecommuncations conferencing system comprising:

a conference bridge having a plurality of ports;

means for establishing voice connections between a plurality of conference participants and respective ports of said conference bridge;

means for assigning human readable labels individual to each of said participants and their respective ports;

means for establishing data connections between said conference bridge and respective video monitors for at least some of said participants;

means for displaying respective ones of said labels for the active speakers at a fixed location relative to the locations of labels for other participants on each of said video monitors;

means for detecting which of said ports are being used by the currently active speakers; and means for continually updating said displayed labels according to detected ports by changing the labels at said fixed location as the currently active speakers change.

* * * * *